(12) United States Patent  (10) Patent No.: US 7,511,973 B2
Kesterson et al.  (45) Date of Patent: Mar. 31, 2009

(54) CONSTANT CURRENT MODE RIPPLE ATTENUATION METHOD IN FLYBACK POWER SUPPLY

(75) Inventors: John W. Kesterson, San Jose, CA (US); Junjie Zheng, Santa Clara, CA (US)

(73) Assignee: iWatt Inc., Los Gatos, CA (US)

( * ) Notice: Subject to any disclaimer, the term of this patent is extended or adjusted under 35 U.S.C. 154(b) by 16 days.

(21) Appl. No.: 11/856,582

(22) Filed: Sep. 17, 2007

(65) Prior Publication Data
US 2008/0067994 A1    Mar. 20, 2008

Related U.S. Application Data

(60) Provisional application No. 60/845,658, filed on Sep. 18, 2006.

(51) Int. Cl.
  *H02M 3/335*    (2006.01)

(52) U.S. Cl. .............. 363/21.01; 363/21.08; 363/21.16; 363/46

(58) Field of Classification Search ............. 363/21.01, 363/21.02, 21.08, 21.09, 21.12, 21.16, 21.17, 363/23, 25, 39, 40–47; 323/283, 284
See application file for complete search history.

(56) References Cited

U.S. PATENT DOCUMENTS

| | | | |
|---|---|---|---|
| 6,166,927 A * | 12/2000 | Farrington et al. | 363/25 |
| 6,760,203 B2 * | 7/2004 | Usui | 361/18 |
| 7,362,593 B2 * | 4/2008 | Yang et al. | 363/21.16 |
| 7,443,700 B2 * | 10/2008 | Yan et al. | 363/21.01 |
| 2008/0112193 A1 * | 5/2008 | Yan et al. | 363/21.08 |

* cited by examiner

*Primary Examiner*—Jessica Han
(74) *Attorney, Agent, or Firm*—Fenwick & West LLP

(57) ABSTRACT

A modification of a control loop of a primary side sensing power control system that uses a different and unique relationship to accomplish the constant current control while attenuating the affects of a ripple voltage.

9 Claims, 6 Drawing Sheets

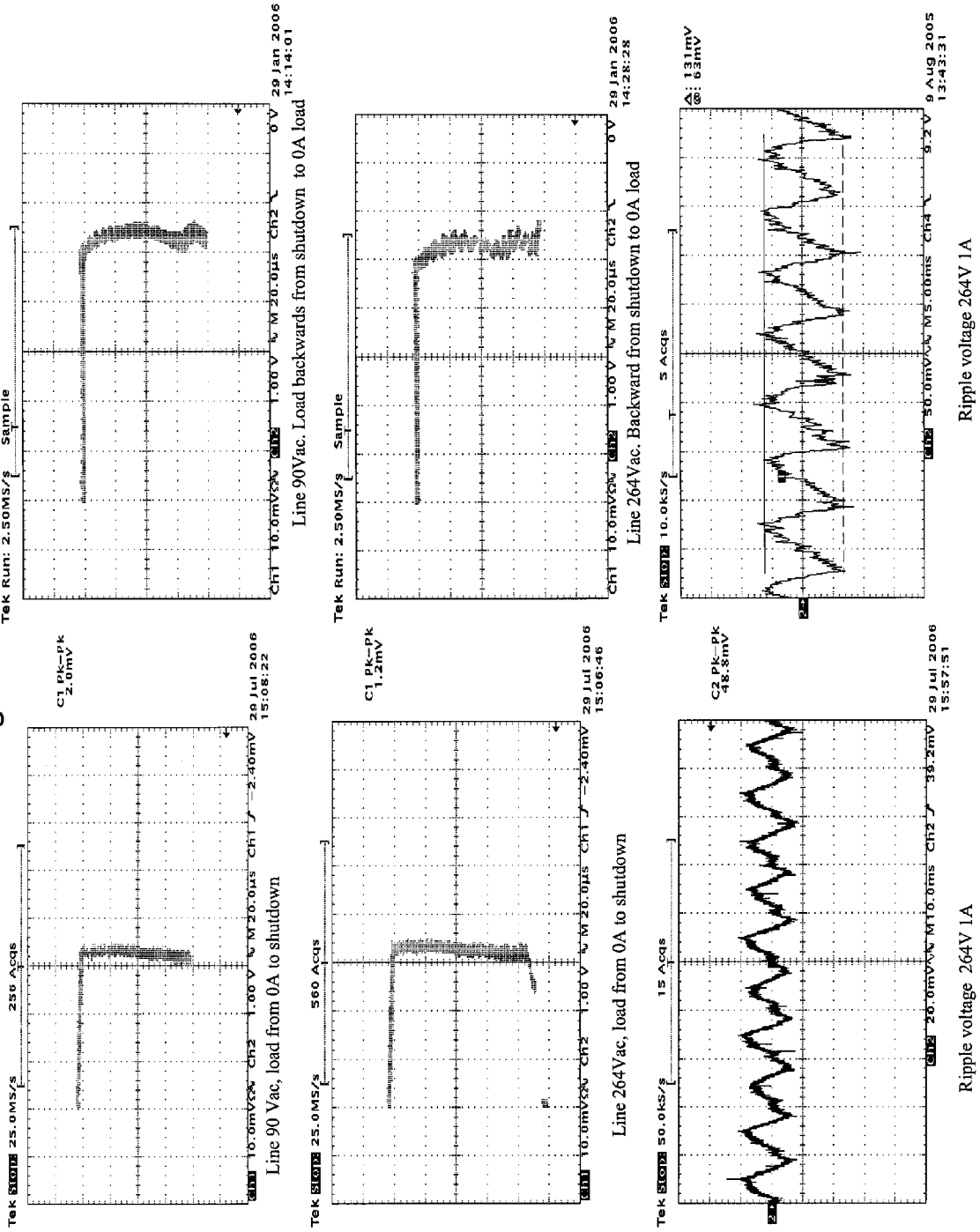

CONSTANT CURRENT MODE RIPPLE ATTENUATION METHOD IN FLYBACK POWER SUPPLY

RELATED APPLICATIONS

This application claims priority from U.S. provisional application No. 60/845,658 which is incorporated by reference herein in its entirety.

This application is related to U.S. application Ser. No. 11/558,326 filed on Nov. 9, 2006 which is incorporated by reference herein in its entirety.

FIELD OF THE INVENTION

The present invention is related to a power supply and more particularly to pulse width modulation (PWM) controllers for limiting current with primary-side sensing and feedback.

BACKGROUND OF THE INVENTION

Pulse width modulation (PWM) is a conventional technology used for controlling power converters to achieve output power, voltage, and current regulation. Conventional flyback power converters include a power stage for delivering electrical power from a power source to a load, a switch in the power stage that electrically couples or decouples the load to the power source, and a switch controller coupled to the switch for controlling the on-time and off time for the switch. The on-time and off-time for the switch can be modified by the controller based on a feedback signal representing output power, voltage, or current. The energy is stored in the transformer core gap when the switch is on, and is transferred to the load circuit when the switch is off. Regulation can be accomplished by, among other things, measuring the output power, voltage, or current, and feeding an indicating signal back to the primary side controller, which can modify the $t_{ON}$-time and $t_{OFF}$-time of the switch accordingly to effectively regulate the output power, voltage, or current.

In power supply designs, it is necessary to regulate power, voltage, or current depending upon the application. One type of regulation corresponds to the regulation of current in a mode called "Constant Current", or (CC) mode.

What is needed is a primary side sensing current control system and a method that (1) controls the current limit such that it is maintained within a small range of any acceptable input voltage, e.g., 90 to 264 Volts RMS, and (2) causes the output voltage of the PWM controller to drop as the output load increase when the full current is reached, (3) uses the instantaneous value of the $V_{IN}$ to influence a cycle by cycle calculation of the on-time and off-time, thus allowing removal of the line frequency components from the output by compensating for them on a cycle by cycle basis in the time calculations, and (4) attenuates the ripple performance of the power supply during operation in Constant Current (CC) mode using, for example, this previously mentioned calculation method for generating on-time ($T_{ON}$) during CC mode operation.

SUMMARY OF THE INVENTION

The present invention is a modification of a control loop of a primary side sensing power control system that uses a different and unique relationship to accomplish the constant current control. The previous described invention uses the relationship between the product of the on-time, and reset-time, and the instantaneous $V_{IN}$ with regard to the desired regulation current and this calculation is updated cycle by cycle, basing the current on-time calculation based on the reset cycle of the previous cycle. There is no filtering done in this loop, and therefore the noise bandwidth is considerably larger than what would be seen in the Constant Voltage (CV) mode which actually used a loop filter.

An embodiment of the invention modifies the loop to attenuate the ripple voltage without needing to alter the cycle to cycle update process.

BRIEF DESCRIPTION OF THE DRAWINGS

FIG. 6 is a graph showing experimental results showing the ripple performance with and without the loop modifications according to a one embodiment of the present invention.

DETAILED DESCRIPTION OF THE INVENTION

Figure 1:
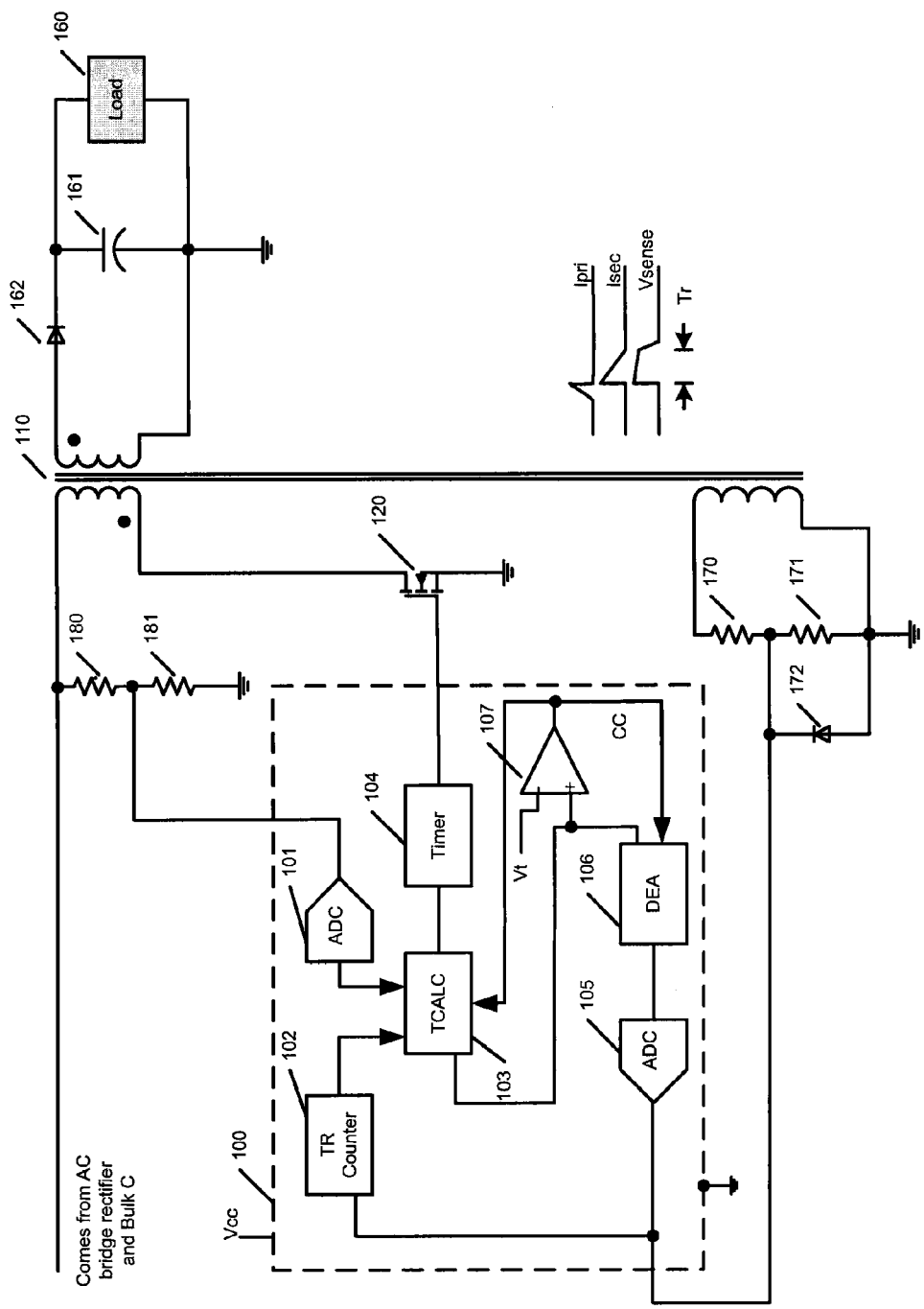
FIG. 1 is an illustration of a primary side sensing power converter circuit.

A preferred embodiment of the present invention is now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory and/or within a logic element. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or "dividing" or the like, refer to the action and processes of a logic device, collection of logic devices, computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Embodiments of the present invention are a loop architecture system and method that (1) controls the current limit such that it is maintained within a small range for any acceptable input voltages, e.g., 90 to 264 Volts RMS, and (2) causes the output voltage of a PWM controller to drop as the output load increases so as to maintain a constant current output, (3) does cycle by cycle calculation compensating for the $V_{IN}$ ripple output from the bridge and bulk filter capacitor so that no loop filter is required in the CC mode and (4) attenuates the ripple performance of the power supply during operation in Constant Current (CC) mode using this previously mentioned calculation method for generating on-time ($T_{ON}$) during CC mode operation. The invention accomplishes this using primary side sending of the reset time for each cycle of the transformer, and using this time measured result to calculate the value of on-time for the operation of the next cycle. The switch period remains fixed, and a single value of on-time is calculated for each cycle. An instantaneous variation in the input line voltage is compensated for in the on-time calculation on each cycle using a direct sampling of the $V_{IN}$ value, resulting in a stable and substantially constant current limit.

The on time for each cycle is calculated based on the measured reset time of the previous cycle according to the following relationship:

$$T_{ON} = \frac{2I_{AS}L_M T_S}{V_{IN}NT_R} \quad (1)$$

Where $I_{AS}$ represents the average output current, $L_M$ is the inductance, $T_S$ represents the switching cycle, and N is the number to turns ration of the transformer. In the above equation, $I_{AS}$, $L_M$, $T_S$, and N are all known parameters. Since they are all known values, equation (1) can be rewritten as shown in equation (2).

$$T_{ON}(n) = \frac{\text{NUM\_TON\_CC}}{V_{IN}T_R(n-1)} \quad (2)$$

This form of the equation is implemented in one embodiment of the present invention.

Figure 2:
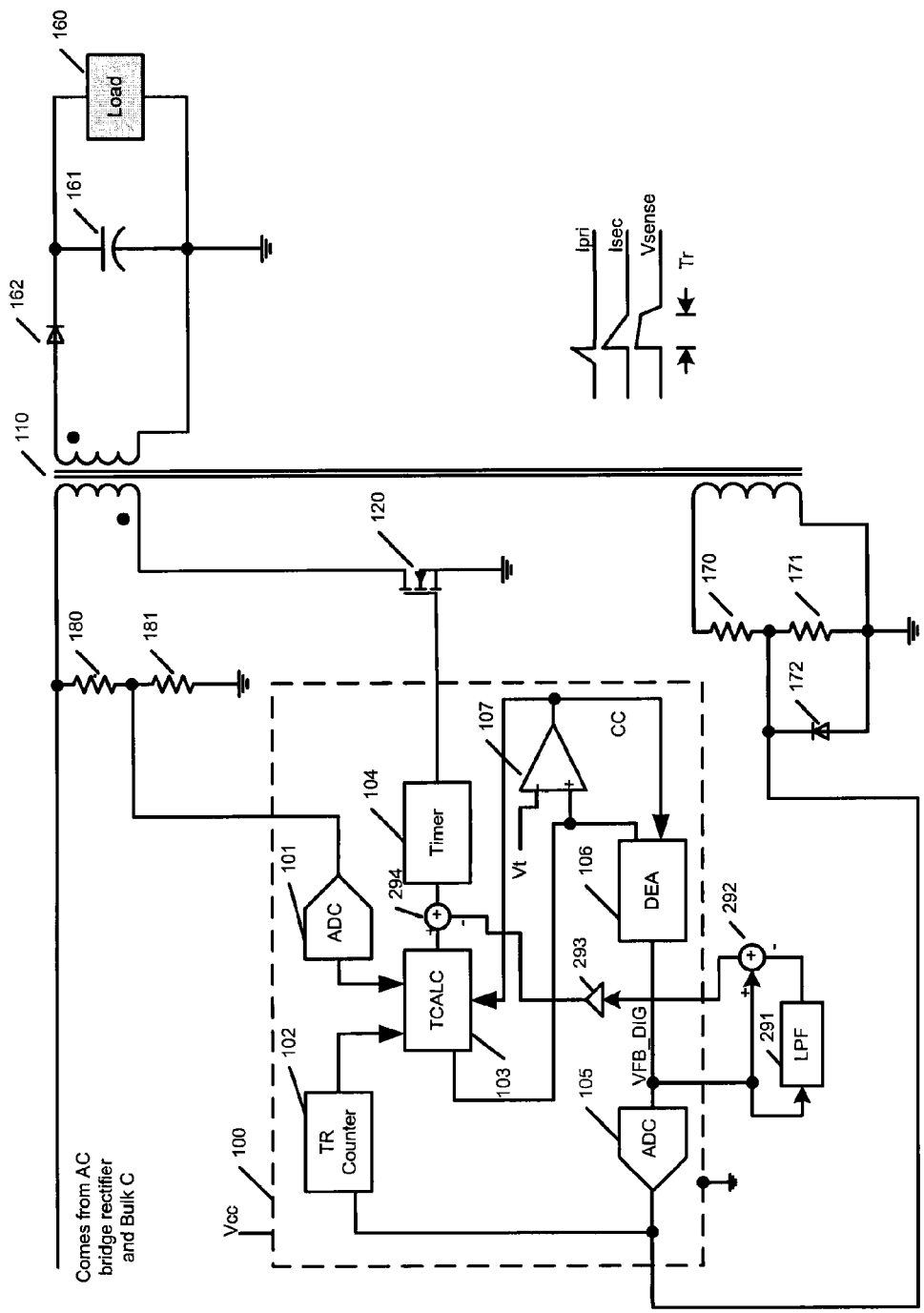
FIG. 2 is an illustration of the modification to the loop architecture design illustrated in FIG. 1 according to one embodiment of the present invention.

FIG. 1 is an illustration of one embodiment of the invention. FIG. 2 is an illustration of another embodiment of the present invention and is a modification to the control loop illustrated in FIG. 1 during operation in Constant Current (CC) mode that reduces the ripple by compensating for it by modifying the on-time calculation results before they are used to generate the PWM stream.

A full wave rectifier receives an AC signal that is typically filtered with an input bulk capacitance that causes the $V_{IN}$ signal to appear as a large DC voltage with a ripple at twice the line frequency. The input range typically ranges from 90 to 264 Volts RMS. The signal $V_{IN}$ can therefore be as much as 375 volts DC with ripple of anywhere up to 50 volts peak to peak. This DC signal is coupled to the primary winding of the transformer 110 of FIG. 1. Transformer 110 incorporates a primary and auxiliary winding on the primary side and a secondary winding on the secondary (output) side. In this conventional circuitry, resistors 170, 171, and diode 172 can be used to sense the voltage ($V_{SENSE}$) on the auxiliary winding of transformer 110. This voltage measurement is used in the normal Constant Voltage (CV) mode of operation. In this mode, the $V_{SENSE}$ signal is digitized by ADC 105, compared with a reference, and passed through a Digital Error Amplifier (DEA) to create a control voltage (Vc). This Vc is used to drive a time calculation circuit which derives an on time ($T_{ON}$) based on Vc and the input voltage ($V_{IN}$) by the controller 100. The output of the calculator TCALC 103 informs a digital timing circuit 104 of the precise on-time and off-time required by the next cycle. The timer 104 generates the PWM pattern specified by TCALC 103 which drives the switching FET 120 for the period $T_{ON}$ during the period $T_S$.

When the Control Voltage (VC) exceeds a threshold, a signal is fed to TCALC to let it know it must do Constant Current (CC) mode operations instead of CV operations. This signal also tells the DEA to clamp its operations so that the $V_C$ will not go very much above the threshold. In this mode, the TCALC machine 103 performs the two divisions described above instead of using $V_C$ to derive on-time and off-time. This efficiently uses the division circuitry in the TCALC machine 103. Now it uses the reset time from the previous cycle which was measured by $T_R$ counter 102. The $T_R$ counter can be a shared counter that is used for other purposes as well, e.g., it can be used for Timer 104. In the CC mode of operation, TCALC 103 knows the value of NUM_TON_CC, it receives $V_{IN}$ from ADC 101, and receives the reset time ($T_R$) from the $T_R$ counter 102. Therefore, it is able to calculate on-time on a cycle by cycle basis. If the load changes, the reset time changes accordingly; and the on-time will then be adjusted on the next cycle to compensate for such a load change. Therefore a constant current regulation will be sustained with a varying output voltage.

After the on-time has been calculated by the TCALC 103, and before the result is passed to the timer 104, the value is modified by a subtract operation using adder 194. Since we know that $V_{OUT}$ from the flyback power converter is a linear function of $T_{ON}$ according to:

$$V_{out} = V_{in}T_{on}\sqrt{\frac{R}{2L_M T_S}} \quad (3)$$

We know that to remove a known ripple signal from the final output, that a scaled version of it could be subtracted from the on time ($T_{ON}$) as it is going to the timer using a scalar.

As this modified version of ($T_{ON}$) controls the output, by super-positioning, the ripple can be effectively subtracted out.

To generate the signal to be subtracted, in one embodiment of the present invention shown in FIG. 2, a digital low pass filter 291 in the form of a simple first order infinite impulse response (IIR) filter is used. The source signal for this filter is the output of the Analog to Digital Converter (105), and it is a signal sometimes called VFB_DIG, which is a digital reflection of the output voltage. It includes the ripple component. The signal coming out of the DSP Low Pass Filter 291 is subtracted (using adder 292) from the original input signal (VFB_DIG). The subtraction of a low pass function from an "all pass" function results in a "high pass" function. This is seen by the following Laplace domain demonstration. Equation (4) below is the Laplace domain representation of a Low Pass filter.

$$G(s) = \frac{\omega}{s+\omega} \quad (4)$$

Equation (5) below is the Laplace domain representation of an All Pass filter:

$$G(s)=1 \quad (5)$$

By subtraction of (4) from (5), one gets a high pass transfer function with an origin zero and a pole at the same location where the pole was in the low pass transfer function:

$$G(s) = 1 - \frac{\omega}{s+\omega} = \frac{s+\omega-\omega}{s+\omega} = \frac{s}{s+\omega} \quad (6)$$

This result of the high pass filter is a signal containing only the ripple component, and it is scaled by scalar 293 so that the peak to peak ripple voltage in least significant bits (LSB's) is scaled down to the corresponding number of LSB's in $T_{ON}$ that would correspond to a similarly sized ripple according to equation (3) above. The result is subtracted using adder 294 from the on-time calculation result before it is used in the Timer 104.

Figure 3:
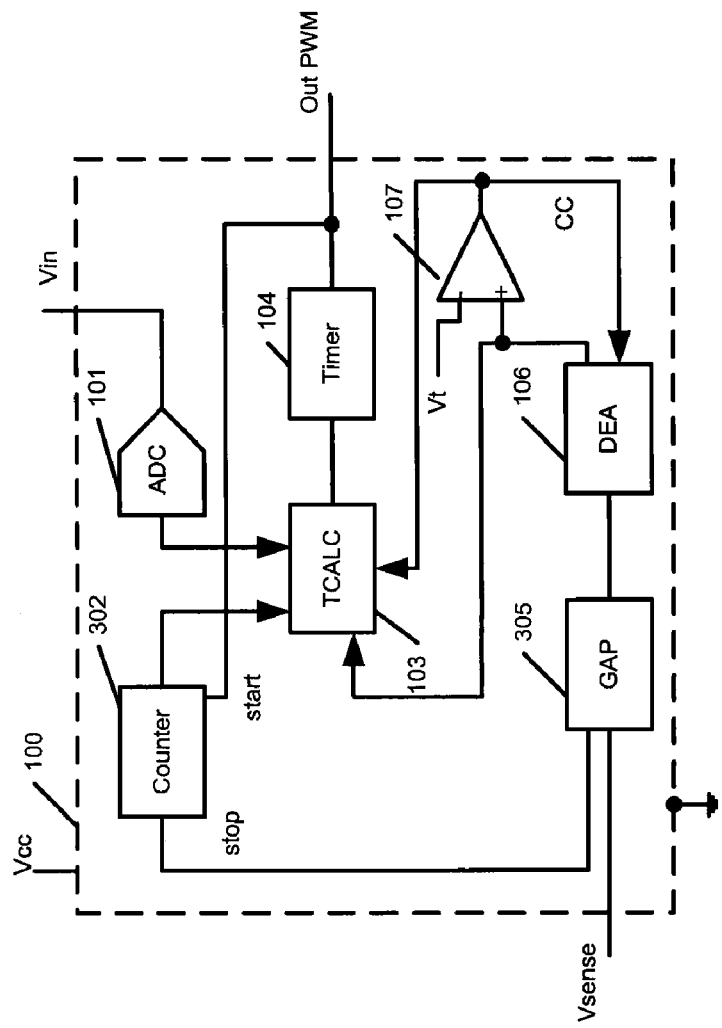
FIG. 3 is another embodiment of the controller 100.

FIG. 3 is another embodiment of the controller 100 of the present invention that does not contain the improvement of the presently discussed invention. In one embodiment of the present invention the counter 102 is enabled to reset and begin a new count at the falling edge of signal PWM_OUT. The counter is stopped when the GAP detector 305 identifies the knee in the $V_{SENSE}$ signal. One example of a GAP detector 305 is described in U.S. Pat. No. 6,956,750 which is incorporated by reference herein in its entirety. The counter 102 can also be stopped by using a comparator to measure the falling edge of the $V_{SENSE}$ signal. The counter thus represents the digital measurement of the reset time ($T_R$ or $T_{RESET}$). Some time after this counter has stopped a pulse is generated called "TCALC". This will cause the TCALC device 103 to perform two divisions. First, it will take the NUM_TON_CC and divide it by the current value of $V_{IN}$(n−1). Then it will take that intermediate result, and divide it further by the counter value (Tr(n−1)). The result will be the on-time ($T_{ON}$(n)) for the next cycle. This result is passed to the Timer 104 and used for the generation of the next cycle of the PWM_OUT signal. In another embodiment, the counter 102 can be part of the timer 304.

Figure 4:
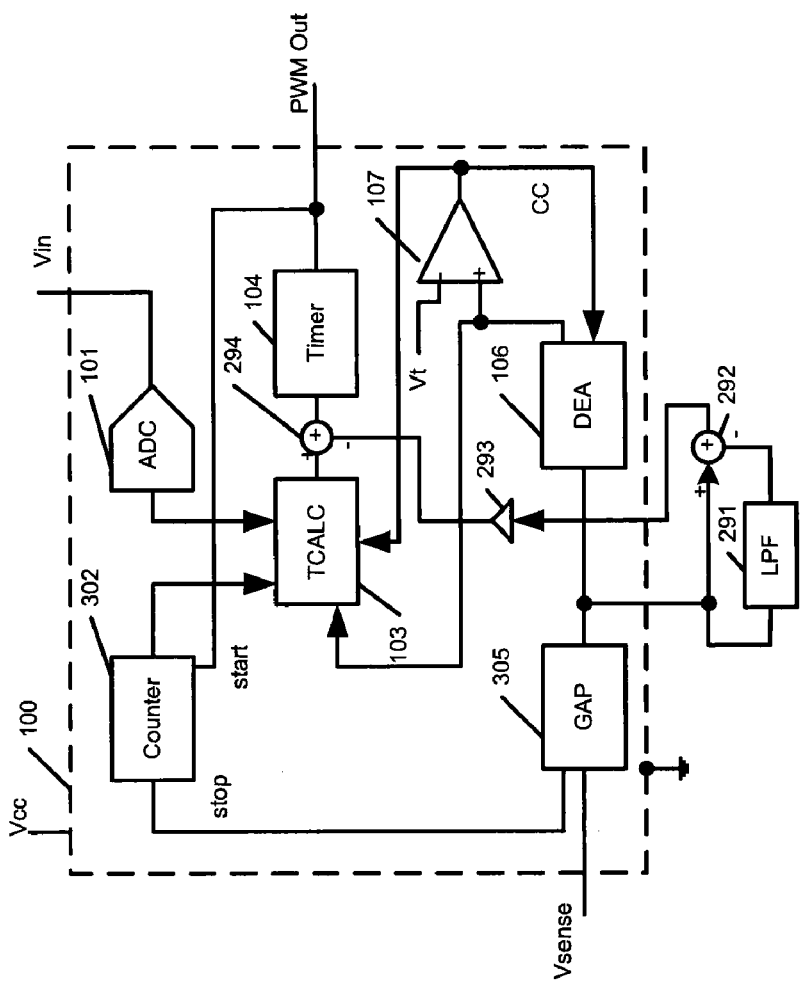
FIG. 4 is an illustration of the modification to the loop architecture design of the embodiment of FIG. 3 with the present invention.

FIG. 4 is another embodiment of the controller of the present invention based on the embodiment shown in FIG. 3 that includes ripple attenuation logic (including LPF 291, adders 292, 294 and scalar 293). The operation of the ripple attenuation logic is otherwise similar to that described above with respect to FIG. 2.

Figure 5:
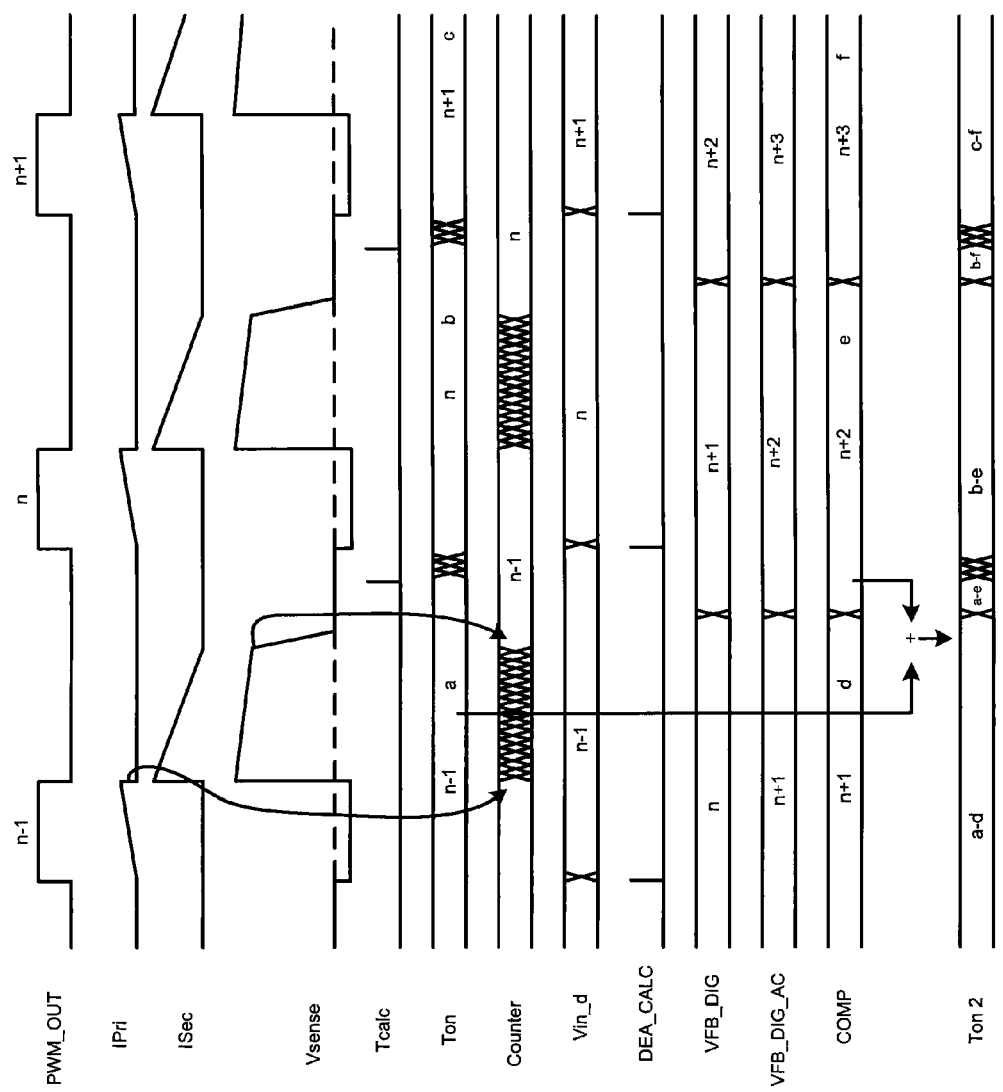
FIG. 5 is a timing diagram of the circuits illustrated in and FIG. 4 in accordance with embodiments of the present invention.

FIG. 5 is a timing diagram of the circuits illustrated in and FIG. 4 in accordance with embodiments of the present invention. In one embodiment, the digital representation of the output signal which comes out of the Gap detector 305 is used to generate the ripple attenuation. The VFB_DIG is fed through a low pass filter 291, the output of which is subtracted from the original VFB_DIG) signal, leaving the AC ripple component left over, called VFB_DIG_AC. This value is scaled in 293 where the scaled result is called COMP. It is then subtracted using adder 294 from the Ton result to arrive at a new on-time ($T_{ON2}$) which is now used for the generation of the PWM_OUT signal for the next cycle. $I_{PRI}$ is the primary side current, $I_{SEC}$ is the secondary side current. DEA_CALC is the signal that triggers calculations by the Digital Error Amplifier once per switching cycle and Vin_d represents the digital value of the input signal as created by the ADC or the GAP detector.

FIG. 6 is a graph showing experimental results for one embodiment of the present invention. The AC ripple is shown to be attenuated by nearly 10 db using this method, and no instabilities are introduced.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention.

What is claimed is:

1. A method for limiting an output current of a power supply over multiple switching cycles in a constant current mode using pulse width modulation and attenuating a voltage ripple on a digital feedback signal, said power supply having a primary and secondary side, the method comprising the steps of:
   generating a sense voltage signal on the primary side that is proportional to an output voltage signal on the secondary side;
   measuring a reset time on the primary side using said sense voltage signal, said reset time representing a duration of a current pulse on the secondary side;
   generating a ripple compensation signal representing a output voltage ripple signal;
   generating a first digital voltage signal used to maintain a substantially constant current on the secondary side, said first digital voltage signal representing the on-time for a subsequent switching cycle, wherein a product of said on-time for a subsequent switching cycle and said reset-time for a present switching cycle is a first value, wherein said first value is substantially constant for multiple switching cycles;
   generating the digital feedback voltage signal by combining said first digital signal and said ripple compensation signal.

2. The method of claim 1, wherein said step of generating a ripple compensation signal includes the steps of:
   filtering said sense voltage signal using a low pass filter to generate a filtered sense signal representing the digital feedback signal without said voltage ripple; and
   subtracting said filtered sense signal from said sense voltage signal to generate said voltage ripple signal.

3. The method of claim 2 wherein said step of generating a ripple compensation signal further comprises the step of:

scaling said voltage ripple signal to a first level that is compatible with said first digital voltage signal.

4. A power supply control system for limiting an output current of a power supply over multiple switching cycles in a constant current mode using pulse width modulation and attenuating a voltage ripple on a digital feedback signal, said power supply having a primary and secondary side, the method comprising the steps of:

sense voltage means for generating a sense voltage signal on the primary side that is proportional to an output voltage signal on the secondary side;

reset time means for measuring a reset time on the primary side using said sense voltage signal, said reset time representing a duration of a current pulse on the secondary side;

ripple detection means for generating a ripple compensation signal representing a voltage ripple signal;

intermediary means for generating a first digital voltage signal used to maintain a substantially constant current on the secondary side, said first digital voltage signal representing the on-time for a subsequent switching cycle, wherein a product of said on-time for a subsequent switching cycle and said reset-time for a present switching cycle is a first value, wherein said first value is substantially constant for multiple switching cycles;

feedback means for generating the digital feedback voltage signal by combining said first digital signal and said ripple compensation signal.

5. The power supply control system of claim 4, wherein said ripple detection means comprises:

low pass filtering means for filtering said sense voltage signal using a low pass filter to generate a filtered sense signal representing the digital feedback signal without said voltage ripple; and ripple identification means for subtracting said filtered sense signal from said sense voltage signal to generate said voltage ripple signal.

6. The power supply control system of claim 5 wherein said ripple detection means further comprises:

scaling means for scaling said voltage ripple signal to a first level that is compatible with said first digital voltage signal.

7. A power supply control system for limiting an output current of a power supply over multiple switching cycles in a constant current mode using pulse width modulation and attenuating a voltage ripple on a digital feedback signal, said power supply having a primary and secondary side, the method comprising the steps of:

a sense voltage device having a winding on the primary side to generate a sense voltage signal on the primary side that is proportional to an output voltage signal on the secondary side;

a counter, to determine a reset time on the primary side using said sense voltage signal, said reset time representing a duration of a current pulse on the secondary side;

a ripple detector, for generating a ripple compensation signal representing a voltage ripple signal;

a preliminary feedback signal, disposed to receive said reset time, to generate a first digital voltage signal used to maintain a substantially constant current on the secondary side, said first digital voltage signal representing the on-time for a subsequent switching cycle, wherein a product of said on-time for a subsequent switching cycle and said reset-time for a present switching cycle is a first value, wherein said first value is substantially constant for multiple switching cycles;

a feedback device, disposed to receive said ripple compensation signal and said first digital voltage signal to generate the digital feedback voltage signal by combining said first digital signal and said ripple compensation signal.

8. The power supply control system of claim 7, wherein said ripple detector comprises:

a low pass filter for filtering said sense voltage signal to generate a filtered sense signal representing the digital feedback signal without said voltage ripple; and a ripple identifier, coupled to said low pass filter, for subtracting said filtered sense signal from said sense voltage signal to generate said voltage ripple signal.

9. The power supply control system of claim 8 wherein said ripple detector further comprises:

a signal scalar for scaling said voltage ripple signal to a first level that is compatible with said first digital voltage signal.

* * * * *